United States Patent
Mosterman et al.

(10) Patent No.: US 9,530,102 B2
(45) Date of Patent: Dec. 27, 2016

(54) MULTIMODAL INPUT PROCESSING

(71) Applicant: The MathWorks, Inc., Natick, MA (US)

(72) Inventors: Pieter J. Mosterman, Framingham, MA (US); Srikanth Parupati, Framingham, MA (US); Ankit A. Desai, Framingham, MA (US); Ashish Uthama, Arlington, MA (US); Michael J. Quinn, Providence, RI (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/623,985

(22) Filed: Feb. 17, 2015

(65) Prior Publication Data

US 2016/0239751 A1    Aug. 18, 2016

(51) Int. Cl.
*G06N 7/00* (2006.01)
*G06N 5/02* (2006.01)

(52) U.S. Cl.
CPC ............. *G06N 7/005* (2013.01); *G06N 5/02* (2013.01)

(58) Field of Classification Search
CPC .................................................. G06N 7/005
See application file for complete search history.

(56) References Cited

U.S. PATENT DOCUMENTS

| | | | | |
|---|---|---|---|---|
| 5,710,916 | A * | 1/1998 | Barbara | G06F 17/30247 |
| 2003/0234772 | A1* | 12/2003 | Zhang | G06F 17/30843 |
| | | | | 345/177 |
| 2013/0127980 | A1* | 5/2013 | Haddick | G06F 3/013 |
| | | | | 348/14.08 |
| 2013/0273968 | A1* | 10/2013 | Rhoads | G06F 17/30244 |
| | | | | 455/556.1 |
| 2013/0278631 | A1* | 10/2013 | Border | G02B 27/017 |
| | | | | 345/633 |
| 2015/0055871 | A1* | 2/2015 | Muthuswamy | G06K 9/00456 |
| | | | | 382/195 |

* cited by examiner

*Primary Examiner* — Alan Chen
(74) *Attorney, Agent, or Firm* — Nelson Mullins Riley & Scarborough LLP

(57) ABSTRACT

Exemplary embodiments described herein provide methods, mediums, and systems for recognizing a formalism type present in an input and generating an output that is consistent with the formalism type. In order to generate an output that is consistent with the formalism type, exemplary embodiments analyze elements of the input together. Such a holistic analysis determines or uses a likelihood that the different elements coexist together in a given formalism type. Based on this holistic analysis, an appropriate formalism type that is consistent with the coexistence of the elements may be selected. After the appropriate formalism type is selected, the input may be processed to generate an output consistent with the formalism type. The output may be computer-based representations of the input defined according to a program associated with the identified formalism type, and/or the input may be translated or transformed into another representation.

16 Claims, 17 Drawing Sheets

From Figure 1A

Formalism-Specific Extraction

Output Representation

| Element | Table | Simulink Block Diagram | Plot | Equation | UML Diagram |
|---|---|---|---|---|---|
| Is text or symbols inside block? | 0.33 | 0.33 | 0 | 0 | 0.33 |
| Text outside block? | 0 | 0 | 0.5 | 0.5 | 0 |
| Holistic features of image : Dimensionality reduction of image (Robust PCA) | p1 | p2 | p3 | p4 | p5 |
| Image patch features: Histogram of oriented gradient features | h1 | h2 | h3 | h4 | h5 |

*Figure 4B*

State Transition Diagram

700

To

710

Equation $$\frac{1}{2} + \sum_{n=1}^{\infty} \left[ \frac{2}{n^2\pi^2}((-1)^n - 1)\cos\left(n\frac{\pi x}{2}\right) + \frac{2}{n\pi}(-1)^{n+1}\sin\left(n\frac{\pi x}{2}\right) \right] \quad \underline{720}$$

To
s = 1/2 + symsum((2/(n^2*pi^2))*((-1)^n - 1)*cos(n*pi*x/2) + (2/n*pi)*((-1)^n+1)*sin(n*pi*x/2), 1, inf);
<u>730</u>
Or
Function to use: symsum    <u>735</u>
Toolbox required: Symbolic Math Toolbox Chemical Structural Formula <u>740</u>

To
Compound: Diosgenin    <u>750</u>

|       | 2003   | 2002   | 2001   | 2000  | 1999  | 1998  |
|-------|--------|--------|--------|-------|-------|-------|
| USA   | 10,882 | 10,383 | 10,020 | 9,762 | 9,213 | 8,720 |
| EU    | 10,970 | 9,040  | 8,303  | 8,234 | 8,901 | 8,889 |
| UK    | 1,765  | 1,564  | 1,430  | 1,438 | 1,460 | 1,423 |
| China | 1,575  | 1,434  | 1,345  | 1,252 | 1,158 | 1,148 |
| India | 599    | 510    | 479    | 457   | 447   | 414   |

GDP based on exchange rates over time. Values in billion USDs

_780_

To

_790_

Or
MATLAB table data

Input image of hand-drawn circuit:

To: SimElectronics Model

MULTIMODAL INPUT PROCESSING

DESCRIPTION OF THE DRAWINGS

FIG. 4B is an exemplary probability table used to determine a likelihood that an image is associated with a given formalism based on a holistic analysis of the image.

DETAILED DESCRIPTION

Figure 1A:
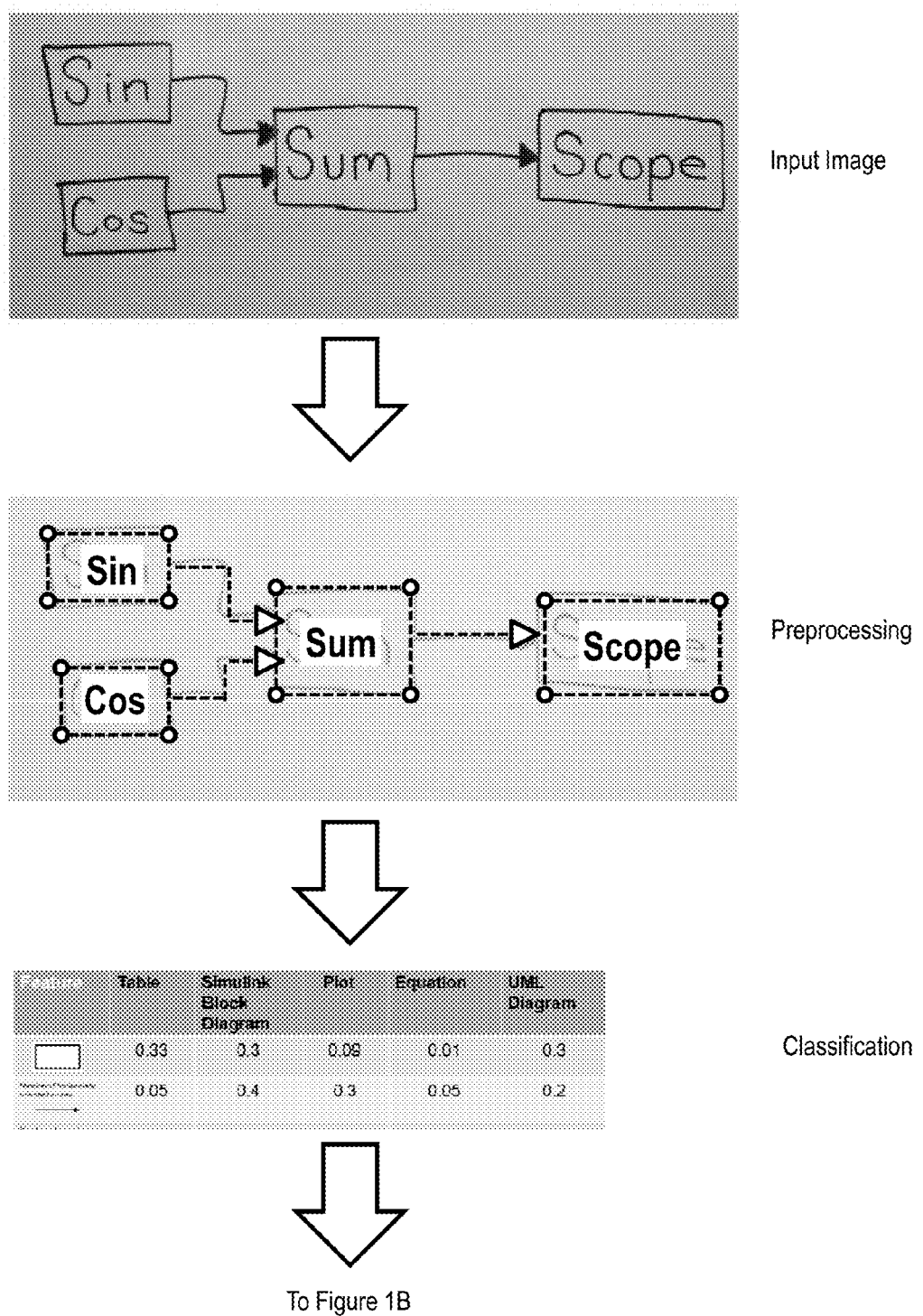
FIGS. 1A-1B depict an example of identifying a formalism in an input and generating an output corresponding to the formalism.

Exemplary embodiments described herein provide methods, mediums, and systems for recognizing a formalism type present in an input and generating an output that is consistent with the formalism type. The output may be generated using formalism-specific processing techniques that are triggered by the recognition that the input includes a particular formalism type.

By providing the capability to recognize formalism types in an input and process the input in a formalism-dependent manner, many different types of inputs can be translated into computer-based representations. For example, a teacher may draw a block diagram on a whiteboard, and a student may snap a photograph of the block diagram which may then be translated into an operable (e.g., having executable semantics) model in block diagramming software. In another example, a user may sketch a mathematical equation, or take a picture of an equation in a book, and the equation may be translated into computer code or a reference to a computer-executable function that implements the equation.

A formalism may represent a way to organize or represent information. A formalism may define or describe a syntax for structuring the information and/or a valid alphabet for representing the information. Different formalisms may be identified by different notation styles. In some cases, formalisms may also be known as modalities or domains. Examples of formalisms include, but are not limited to, a table, a block diagram model, a statechart, a Unified Modeling Language (UML) diagram, a mathematical equation, a chemical structure, a chart, and/or, a plot.

According to exemplary embodiments, inputs (e.g., an input to a model) may include one or more types of formalisms. The input may be identified using exemplary embodiments and a structure of the input determined. For example, a structure of an input structure may be made up of two or more related elements (e.g., squares, circles, lines, arrows, text, etc.) that are arranged according to a formalism type. The formalism type of the structure may be unknown to a system processing the input at the time the input is accessed.

In order to generate an output that is consistent with the unknown formalism type, exemplary embodiments analyze elements of the structure in context. For example, if an input includes two elements, exemplary embodiments may analyze the elements together. The analysis may determine or use a likelihood that the different elements coexist together in a given formalism type. Based on this analysis, an appropriate formalism type that is consistent with the coexistence of the elements may be selected (e.g., from a library that includes a quantity of valid formalism types).

After the appropriate formalism type is selected, the input may be processed to generate an output consistent with the formalism type. In exemplary embodiments, the output may include one or more computer-based representations of the input defined according to a program associated with the identified formalism type. Alternatively, or in addition the input may be translated or transformed into another representation. For example, an input equation may be transformed into computer code representing the equation, or a table of data may be transformed into a graph of the data.

Figure 1B:
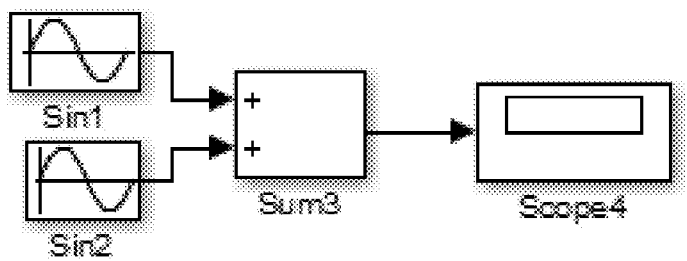

An example of a process for converting an input of an unknown formalism type into an output is shown in FIGS. 1A-1B.

In the top-most panel of FIG. 1A, an exemplary input image is depicted. In this example, the image is of a hand-drawn block diagram model. The block diagram model includes a sine block and a cosine block providing outputs to a sum block, where the output of the sum block is provided to a scope block. Several steps may be performed in order to identify the formalism (block diagram model) in the image, and to generate a computer-based representation (e.g., a Simulink model) of the input.

The middle panel of FIG. 1A depicts an exemplary preprocessing step performed using a computing device. The preprocessing step identifies one or more structures in the image. For example, the entire block diagram model may be a single structure made up of interconnected structures representing the blocks of the block diagram model. The interconnected structures making up the block diagram model may be referred to as elements and may include, but are not limited to, boxes/blocks, arrows, and text. In order to arrive at the representation shown in the middle panel of FIG. 1A, the lines representing the boxes and arrows may be identified and isolated (e.g., by using an edge-detection algorithm), and the text in the boxes may be extracted (e.g., using an optical character recognition algorithm).

After the block diagram model elements are isolated, the elements may be analyzed together to determine a likelihood that the elements would coexist in a given formalism (e.g., an executable time-based block diagram model). Analyzing the elements together allows the formalism to organize the input structure(s) to be identified. This may be accomplished, for example, by consulting a table of probabilities. An example of such a table is depicted in the bottom panel of FIG. 1A. The table of probabilities may be a computer-readable data store stored in a non-transitory computer readable medium (e.g., random access memory).

This exemplary table includes a list of possible elements that may appear in a structure (along the left-most column), and a list of possible formalisms (along the top-most row). Each cell in the table represents a probability that the image includes the formalism in the top-most row, given that the structure in the left-most column is identified in the image. These probabilities may be determined, for example, by analyzing samples of the formalisms to identify a probability that different elements occur in the formalism.

For example, as shown in the exemplary probability table of FIG. 1A, the input image could contain elements organized according to a Table formalism or according to a Block Diagram formalism (among other possibilities). In other words, the elements could come together to make a table, or could come together to make a block diagram.

According to the probability table of FIG. 1A, the probability of there being a Table formalism in the image (given that a box element is present in the image) is determined to be 33%, whereas the probability of that there is a Block Diagram formalism in the image (given that a box element is present in the image) is determined to be 30%. If the box element were analyzed in isolation, there is a greater likelihood that a table formalism is present in the image (33% likelihood) rather than a block diagram (30% likelihood).

Exemplary embodiments reduce the chance of misclassification by examining the elements together in order to determine a likelihood that the elements would coexist in a given formalism. In this case, the table also includes several arrow elements. As shown in the table, the probability of seeing an arrow element in the Table formalism is relatively low (5%) while the probability of seeing an arrow element in the Block Diagram formalism is relatively high (40%).

In one embodiment, the individual probabilities that each element is found in a given formalism may be added together in order to generate an overall score for the formalism. In the example described above, the overall score for the table formalism is 38 (33%+5%), while the overall score for the block diagram formalism is 70 (30%+40%). The block diagram formalism may be selected since it has the highest score.

Exemplary embodiments can use the probabilities from the table to identify and select a formalism type that is compatible with the coexistence of elements existing in an input.

Referring now to FIG. 1B, exemplary embodiments may select a processing technique that is specific to the selected formalism type. For example, the computed scores from the table of FIG. 1A may be used to select a processing technique such as the one shown at the top of FIG. 1B. The flowchart in the top panel of FIG. 1B converts elements identified in the pre-processing step (e.g., a square with the word "cos" in the middle) into formalism-specific elements (e.g., a cosine block in a block diagram model). The details of this particular extraction method will be discussed in more detail below with respect to the processing of a block diagram model.

After performing the formalism-specific processing, the result may be an output that is represented in a manner consistent with the formalism identified in the classification step in the bottom panel of FIG. 1A. In the example of FIGS. 1A-1B, the output is a computer-based block diagram model such as the one depicted in the bottom panel of FIG. 1B. The computer-based block diagram model may be simulated or executed to carry out the functionality of the model that was originally drawn in the input. In this case, the output is imbued with functionality, such as generating a sine and cosine signal, adding the signals, and displaying the results. The output blocks may be made up of, or associated with, executable code that, when executed, performs the functions labeled on the blocks.

Each of the above-described steps (e.g., receiving the input, pre-processing, classification, formalism-specific extraction, and generating an output) will now be described in more detail.

Initially, an input may be accessed or created. The input may include, for example, an image (e.g., a digital photograph or scanned image), audio data, gestural data, haptic data (e.g., information about how hard a user presses on an input device, or how much surface area the user's finger presents to a touch screen), interaction data (e.g., live data recorded from an interaction with a whiteboard), printouts, etc. Input may also be hierarchical, in that one type of input may include other types of inputs. Examples of such hierarchical input may include video data (from which images, sounds, and/or gestural data may be retrieved), etc.

Figure 2:
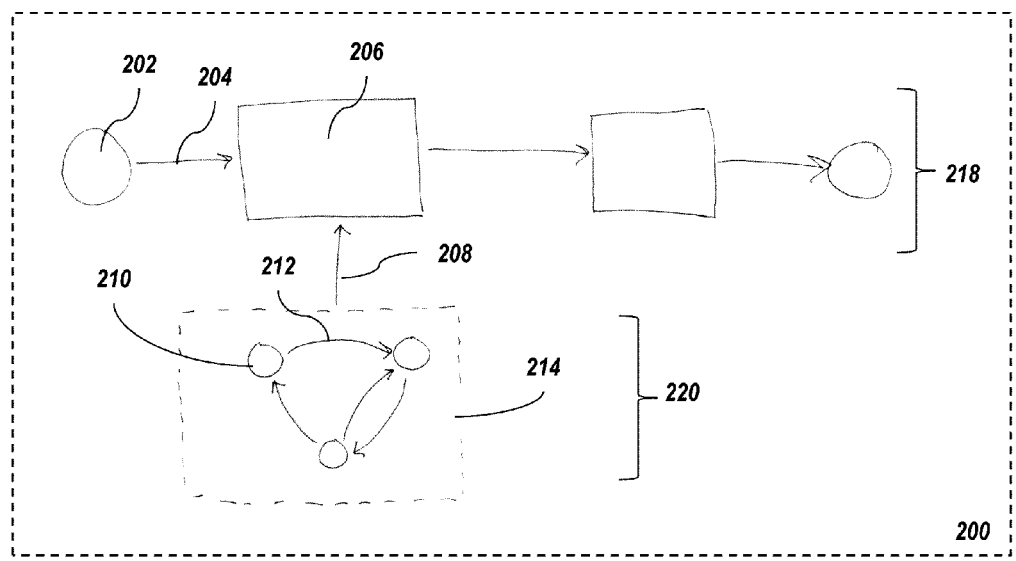
FIG. 2 depicts an example of an input including structures represented according to formalisms.

FIG. 2 depicts an example of an input 200. Input 200 is a scanned image of a hand-drawn block diagram 218 with an embedded state diagram 220.

Input 200 may contain two or more elements. Elements may represent features (e.g., predetermined shapes), strings of text, or other basic parts that represent valid building blocks that may be present in an input according to a formalism.

In the input 200 of FIG. 2, several elements 202-214 (among others not specifically referenced) are present. For example, the input 200 includes a first circle element 202, a first straight arrow element 204, a first box element 206, a second straight arrow element 208, a second circle element 210, a curved arrow element 212, and a second box element 214.

The elements may be organized into structures such as block diagram 218 and state diagram 220. A structure may be used to represent groups of related elements that are organized according to a common formalism type (e.g., time-based, event-based, state-based, dataflow-based). An input may include more than one structure, and different structures may be represented according to different formalism types. Thus, multiple formalism types may be present in an input.

The different structures and/or formalism types in an input 200 may be distinguished in a variety of ways. For example, in the input 200, the state diagram 220 is provided inside of the second box element 214, which is designated by dashed lines. The presence of a structure inside of a dashed box may be used to indicate that the structure in the dashed box is distinct from structures outside the dashed box.

Different structures may also be distinguished using different visual or audio characteristics. For example, the state diagram 220 could have been drawn using a different color than the block diagram 218, or using a different line thickness, or (in the case of an audio input) using different terms for the elements in the input (e.g., referring to a box as a "block" when discussing a time-based block diagram, as opposed to a "state" in a state diagram) or different pitches to describe the different structures. Alternatively or in addition, the different structures may be set apart using special characters, keywords, gestures, or other indicators.

If visual or audio characteristics are regularly used to distinguish different structures, then a meaning of the visual or audio characteristics may be learned by the system processing the input. The learned meaning of the visual or audio characteristics may be applied to future inputs (or to different structures within the same input). Other types of machine learning may also be leveraged.

The input may contain information related to parameters or meta information of the model or model elements. For example, the input may include execution information (e.g., which solver to use for executing a model, what step size to use, what tolerances to use, whether to store model output values), code generation information (e.g., which optimizations to apply to code generation, whether to generate HDL or C, which performance characteristics such as speed, size, power, to optimize for), etc. Additionally or alternatively, the input may provide block parameter information (e.g., initial state values, transfer function parameter values, addition or subtraction operations for ports of summation block, data types of input/output/internal variables). Furthermore, information about reuse of diagram fragments (e.g., by creating library blocks) may be indicated graphically (e.g., by labeling a diagram fragment and referencing this label elsewhere on the diagram), and information may be provided about signals (e.g., their name, whether their signal values should be logged, what variable to use to store the data, what dimension the signal has, etc.).

The input may contain information related to editing, navigation, and execution operations. For example, a particular input may cause the diagram to be processed and converted into a data structure. Another input may cause the processed diagram to be executed. Furthermore, results may be projected back onto the input drawing or converted drawing. Such results may include simulation output and/or animation information (such as indicating active states in a state transition diagram during execution). Still further, the input may indicate that a particular element may be copied elsewhere, deleted, converted into a different element, etc. During execution, input may be provided that pauses or resumes execution. Moreover, input may be provided that indicates where execution breakpoints (e.g., for debugging) should be set.

Although the example input 200 in FIG. 2 depicts two different structures belonging to two different formalism types, multiple different structures having the same formalism type may also be present in the input 200. For example, an input may include two time-based block diagrams drawn by a user.

Different structures organized according to different formalism types may be arranged hierarchically. For example, in the input 200, the state diagram 220 is intended to be contained within the first box element 206 of the block diagram model 218.

Hierarchies may be designated in a number of ways. In FIG. 2, a hierarchy is indicated by pairing the second straight arrow element 208 with the second box element 214 (where the second box element 214 is represented with dashed lines). The presence of an arrow and a dashed box may be used to indicate that the structure(s) present inside the dashed box are intended to be nested at a second hierarchical layer inside of an element to which the arrow is pointing.

Hierarchies may also be represented using other visual, audio, or gestural designations. For example, predetermined colors, keywords, sounds, or gestures may be used to signify a hierarchy and/or indicate a relative arrangement of structures in the hierarchy.

Figure 3:
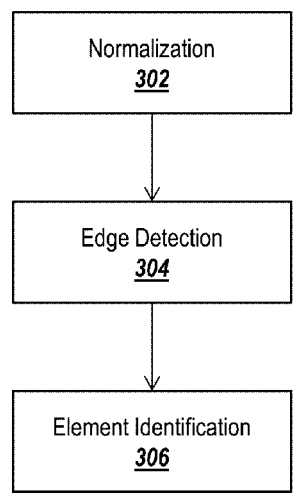
FIG. 3 is a flowchart describing an exemplary preprocessing technique to be performed on an input to identify structures in the input.

After an input is received, the input may be preprocessed in order to identify the structures in the input and/or to identify the elements that make up the structures. FIG. 3 is a flowchart depicting an example of a preprocessing technique 300.

Optionally, at step 302 the image may be normalized to facilitate processing. For example, portions of the image may be scaled up or down in size to match predetermined reference sizes (e.g., from a library of elements, such as the elements included in the above-described probability table) in order to assist in the identification or recognition of shapes, text, or other features in the image.

At step 304, an edge detection algorithm may be carried out. The edge detection algorithm may identify, for example, lines in the image. The lines may be identified by comparing color values in the image and identifying a line when the color changes by more than a predetermined threshold tolerance. Alternatively or in addition, contrast or intensity of pixels in the image may be compared to determine the locations of lines in the image. If one or more lines are connected, such as into predetermined shapes like boxes, circles, or triangles, the shapes may be identified.

At step 306, the lines identified at step 304 may be used to determine the elements present in the image. For example, a database of predetermined valid features may be stored and compared to the lines of the image. If one of the predetermined valid features is found in the image, this may be flagged as a particular type of element in the image.

For example, some of the lines identified at step 304 may be connected into a box shape (e.g., substantially four lines connected at substantially ninety-degree angles). The database of predetermined valid features may include a shape corresponding to a box. If the elements in the image are normalized at step 302, the size of the box in the image may generally correspond to the size of the box in the database of predetermined valid features. If the box in the image corresponds to the box in the database (e.g., there is a similarity between the box in the input image and the reference box from the database that is more than a predetermined threshold amount), then the system may identify a box element in the input image.

In some circumstances, the identity of an element in the image may be ambiguous. For example, a user may draw a rectangle that has rounded corners. It may not be readily apparent whether the user intended to draw a rectangle, a circle, or a rounded rectangle. In exemplary embodiments, context information about the formalism in which the element is found may be used to assist in interpreting the user's intentions. For example, if other elements in the input suggest that the formalism is a statechart, then the object may be interpreted as being more likely to be a circle (e.g., to represent a transition junction) or a rectangle with rounded corners (e.g., to represent a state). If the other elements suggest that the formalism is a table, then the object may be interpreted as being more likely to be a rectangle, which is sometimes used to represents cells in a table.

Accordingly, the image may be analyzed cumulatively. For example, a "running tally" of likelihoods for each formalism type may be calculated as the image is processed. The identity of the element may be interpreted based on the running tally and the current "most-likely" formalism candidate. Alternatively or in addition, processing may proceed in two or more passes. In the first pass, unambiguous elements may be identified or elements may be identified with a high probability and used to make an initial prediction of the formalism involved. Ambiguous elements or elements with a lower probability may then be processed in a second pass, based on the initial prediction of the formalism.

In some embodiments, the elements in the image may be unnormalized. For example, the system may identify a shape in the image, and may determine a proximity and/or relationship of the identified shape to other shapes in the image (e.g., a square connected to a circle by a line having an arrow). The identified shapes, proximities, and relationships may be used to determine which elements are present (or most likely present) in the image.

Figure 4A:
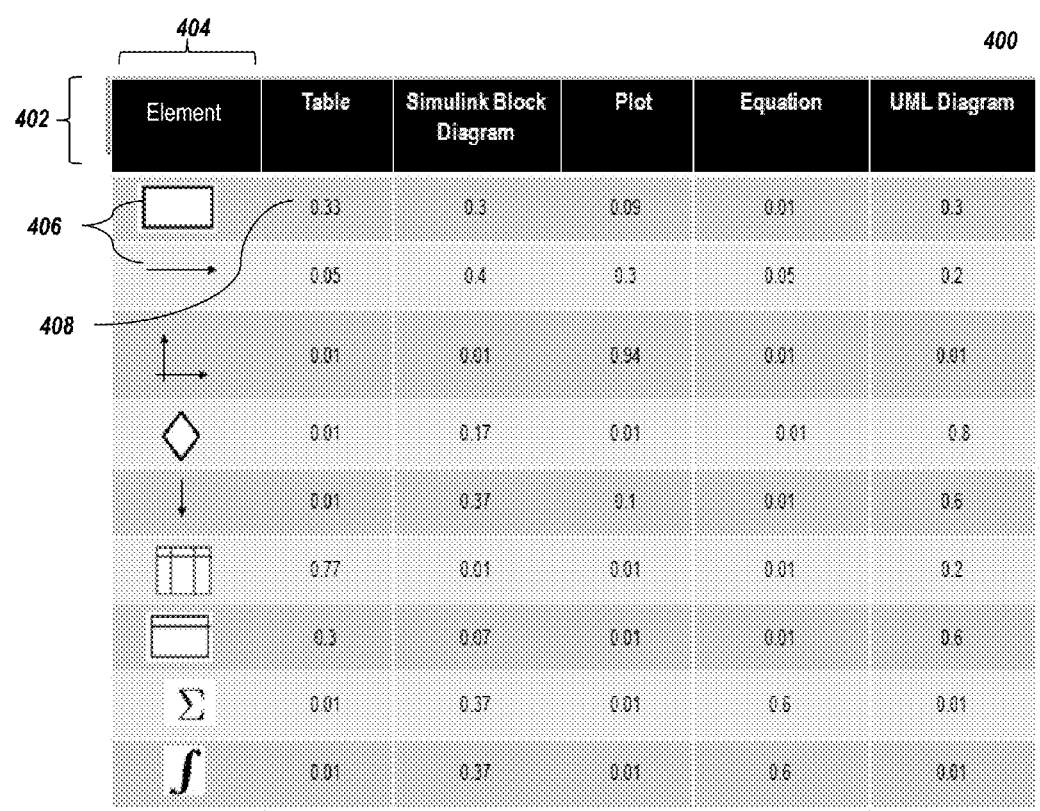
FIG. 4A is an exemplary probability table used to determine a likelihood that two or more elements coexist in a given formalism based on an analysis of elements in an input image.

After the elements making up the structures are identified, the elements may be analyzed together in order to evaluate a likelihood that the elements would coexist in a given formalism. The evaluation may involve, for example, consulting a table of probabilities. FIGS. 4A and 4B include exemplary tables of probabilities 400 and 420, respectively.

The table of probabilities 400 is an exemplary table analyzing the structures present in the input. The table of probabilities 400 may include a row of formalism types 402. The row of formalism types 402 may correspond to a list of valid formalisms stored in a data store, such as a formalism library. The list of valid formalisms may be a predetermined list that includes any formalism for which a formalism-specific processing technique is available. The list of valid formalisms may be extended by adding additional formalism-specific processing techniques, and by specifying any elements that may occur in the formalism.

The table of probabilities 400 may include a column of valid elements 404. The valid elements 404 may be elements that are expected to be encountered in the formalism types 402. Cells in the column of valid elements 404 may include one or more valid elements 406. Valid elements 406 may be added, for example when a new formalism is added (or when new elements are added to an existing formalism). Valid elements 406 may be compared against elements identified in the input.

In some embodiments, the valid elements 406 may be used to identify the elements in the input. In these embodiments, the elements in the input may be resized in step 302 to a standard size that corresponds to the types of valid elements 406 in the probability table 400. The types of valid elements 406 may then be compared to the elements in the input image, and a nearest match to the element in the image may be selected.

The table of probabilities 400 may include a number of cells 408. The cells 408 may define, at the intersection of a particular formalism type in the row of formalism types 402 and element type in the column of element types 404, a probability that the element type appears in the formalism represented by the formalism type. Alternatively or in addition, the table may include contextual information and/or holistic information about the image. For example, FIG. 4B depicts a table of probabilities 420 that includes contextual and holistic information. The contextual and/or holistic information may be used to determine the formalism(s) present in the image.

In the table 420, the element type 410 represents a situation in which text or symbols coexist with a block in an input, and the text/symbols exist inside the block. As shown in FIG. 4, this situation may indicate a relatively high likelihood that the formalism type is a table, block diagram, or UML diagram. On the other hand, if the text/symbols occur outside of the context of a block (either outside of a block in the input, or in an input in which no block exists), this may indicate a high likelihood that the formalism type is a plot or equation.

In another example of holistic analysis, the element type 412 represents a dimensionality reduction of the image using robust principal component analysis (PCA). In a PCA, the image is compared to a predefined library of templates. A feature space may be calculated for the templates in the predefined library, and the input image may also be reduced to a feature space. A Euclidean distance between the feature space(s) of one or more templates and the feature space of the input image may be calculated. These Euclidean distances may be normalized to yield probabilities for the formalisms represented by the templates.

The column of element types 404 may further include image patch features. For example, the element type 414 represents a histogram of oriented gradient features. A Histogram of Oriented Gradients (HoG) describes the directionality of edges (intensity differences of adjoining pixels) in an image patch. With prior training, an application can classify an image patch based on its HoG features. For example, an image patch containing text or equations will have a different feature description than an image patch containing only all or part of a block diagram. HoG is one of the features that can be used to perform this kind of image content classification for a patch.

In another type of analysis, directionality information may be used to interpret elements in the input. For example, if a user draws a line from left-to-right connecting two rectangles, the line may be interpreted as a signal line in a block diagram model (typically represented by an arrow showing the output to input of information between two blocks). The directionality of the line (left-to-right) in this case may be interpreted to provide a direction for the information transfer (e.g., the block on the left may be identified as the source of the information, while the block on the right may be identified as the recipient of the information). An arrow may be created in the block diagram model generated from the input with the appropriate directionality.

A holistic analysis (as shown in the table 420) may be used separately or in combination with a structural analysis (as shown in the table 400). In some cases, the same implementation may be represented either structurally or based on holistic analysis. For example, if multiple blocks are present in the image, and the blocks are arranged side-by-side in close proximity, then there may be an increased likelihood that the formalism in the image is a table. This implementation may be represented by creating a single structure including multiple blocks side-by-side (as shown by the sixth element in the table of FIG. 4A), or by including a holistic element in the table 420 querying whether the blocks are within a predetermined distance of each other.

The probabilities in the tables of probabilities 400 and 420 may be predetermined based on, for example, analyses of samples of structures known to be in the formalism, or may be assigned based on expert knowledge of the formalism. The probabilities may be modified depending on the application. The probabilities may be static or may be dynamically updated. For example, as more formalisms of a given type are encountered, the probability assigned to each cell may be updated to reflect the probabilities of each formalism/structure pair based on the rate that each formalism/structure pair is encountered in operation.

In some embodiments, the probabilities may be adaptively updated based on feedback, such as user feedback. For example, a computing system may make an initial prediction of what formalism a given input is associated with, and a user may provide feedback as to whether the prediction is correct or incorrect. If the prediction is incorrect, the user may further indicate what the correct formalism is. Based on this feedback, the computing system may update the table of probabilities to raise or lower the probability of one or more structures in one or more formalisms. For example, the computing system may lower the probabilities assigned to the structures in the input for the initial (incorrect) predicted formalism, and/or may raise the probabilities assigned to the structures in the input for the correct formalism.

It is noted that the specific probabilities depicted in FIGS. 4A and 4B are intended to be exemplary.

Figure 5:
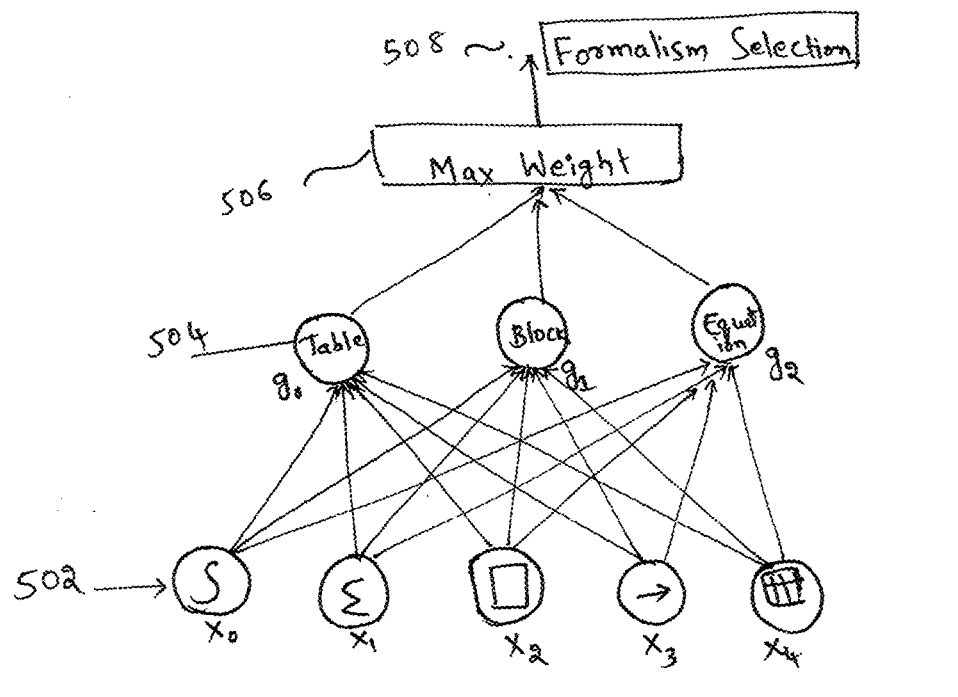
FIG. 5 is an exemplary model for selecting a formalism based on a likelihood that two or more elements coexist in a given formalism.

The probabilities in the table of probabilities 400 may be used as variables of a model used to select a formalism type. An example of such a model 500, in the form of a probabilistic undirected graph is shown in FIG. 5.

The model 500 may include a first layer of nodes 502 corresponding to each of the elements in a structure. A value $x_i$ of each node in the first layer 502 may indicate, for example a number of the elements corresponding to the node in the structure. Alternatively, the value $x_i$ may be a binary value (e.g., $x_i=0$ if none of the elements corresponding to where $x_i$ are in the structure, or $x_i=1$ is the structure contains at least one element corresponding to $x_i$).

The model 500 may further include a second layer of nodes 504 representing a set of costs or weights assigned to different formalisms $g_i$. The cost or weights may correspond to the probabilities of the probability table 400 summed together for a given formalism $g_i$ to generate an overall score for the formalism. For example, if the input image included an arrow and a diamond, then the overall score for the UML Diagram formalism (refer to FIG. 4) may be 1.0 (0.2+0.8). The overall score for the Table formalism, on the other hand, may be 0.06 (0.05+0.01).

The model 500 may include a processing block 506 for selecting the highest-scoring formalism from among the formalisms $g_i$. In the above example, the UML Diagram formalism may be selected over the Table formalism, since the UML diagram formalism has a higher overall score.

Based on the output of the processing block 506, a class or formalism assignment 508 may be determined. In the above example, the input structure may be assigned to the UML Diagram formalism.

An input may contain structures from multiple different formalism types. Accordingly, different portions of the input may be analyzed separately to determine the multiple formalism types present. Furthermore, an output corresponding to the input may have multiple different formalism types, which may be embedded hierarchically and/or maintained separately from each other.

After an appropriate formalism type is selected, the input structure(s) corresponding to the formalism type may be processed using a formalism-specific technique. The same element type may be interpreted in different ways depending on the formalism assigned to the image. For example, one element type that may be present in an image is a fixed point formulation (e.g., an "fi" object in the MATLAB technical computing environment), which specifies a particular representation of a number using a slope and a bias. If the identified formalism supports the use of such a fixed point formulation, the input text identifying the slope and the bias may be properly interpreted so that the number is correctly represented in the output. The formalism-specific technique may support such translations. In some embodiments, certain programs, applications, environments, or processing engines may be associated with one or more formalisms. For example, block diagram models may be built and executed using the Simulink® graphical modeling software by the MathWorks, Inc. of Natick Mass. Mathematical equations may be represented in the MATLAB® technical computing environment (TCE), also by the MathWorks, Inc. Tables, charts, and plots may be designed in the MATLAB (TCE) or in the Excel® spreadsheet software by Microsoft Corp. of Redmond, Wash. The formalism-specific technique may be applied by the program, application, environment, or engine associated with the formalism. Examples of such formalism-specific techniques are shown in FIGS. 6A-6C.

Figure 6A:
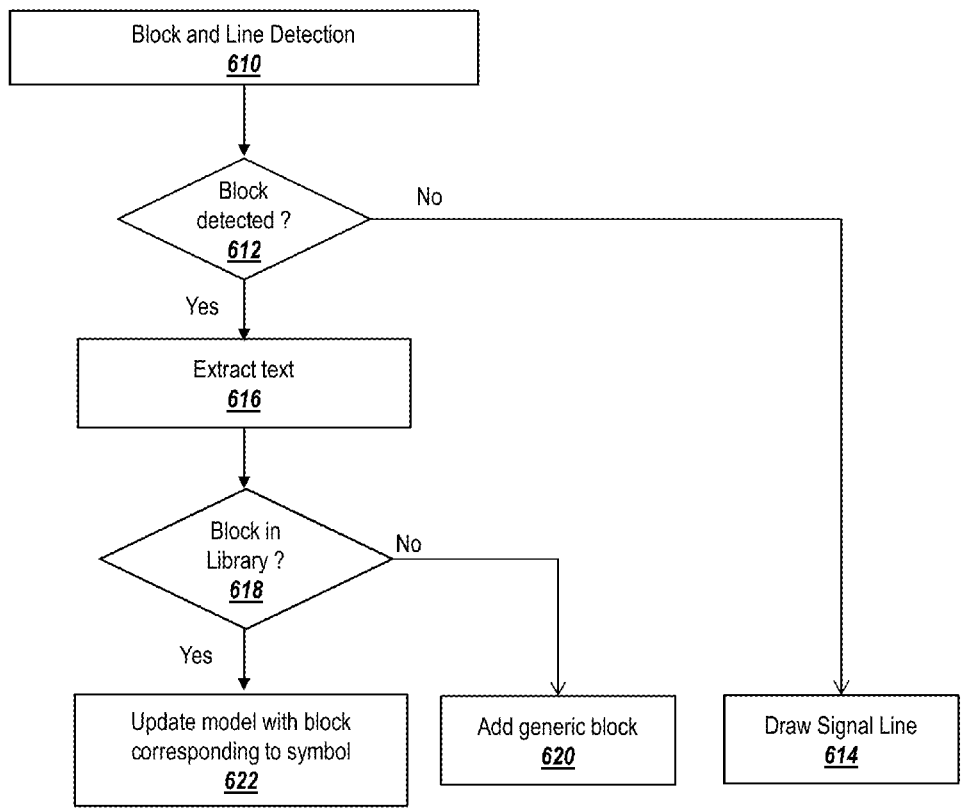
FIGS. 6A-6C describe exemplary formalism-specific processing techniques.
Figure 6B:
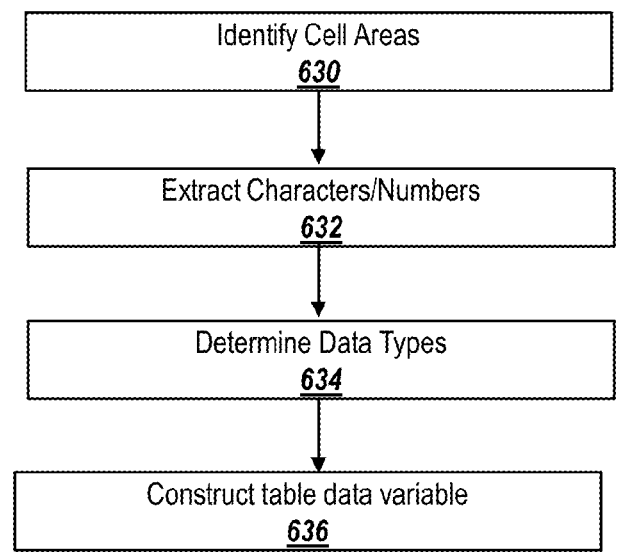
Figure 6C:
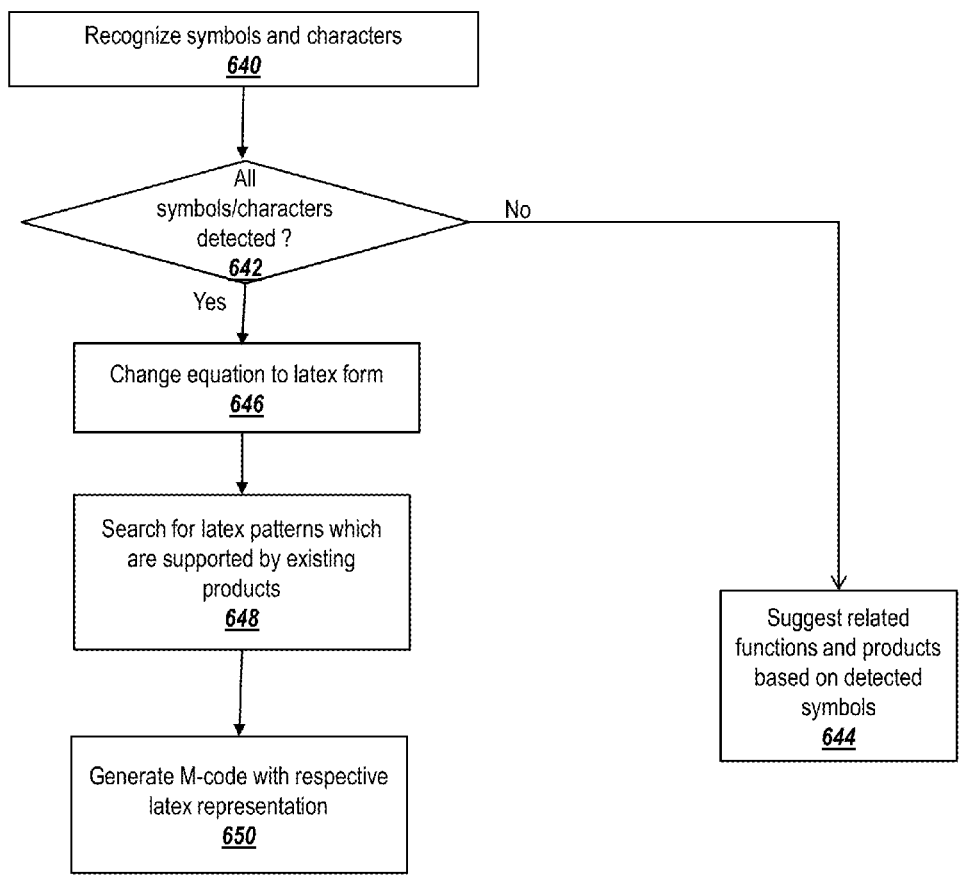

For example, FIG. 6A depicts a block-diagram-specific technique implemented in Simulink modeling software. Using the model description embodied by the input, a system may generate an equivalent Simulink model that reflects the block locations, block sizes, block definitions/types, and appropriate connections between blocks as represented in the input.

At step 610, a block and line detection algorithm may be run. The block and line detection algorithm may analyze the input image to identify rectangles (corresponding to blocks) and arrows (corresponding to lines) within the image. The algorithm may convert pixel coordinates of the rectangles and arrows into a position for the blocks and lines in a block diagram editor. At step 612, each of the blocks and lines detected at step 610 may be analyzed to determine if the analyzed element is a block or a line. For example, the processing may determine whether the analyzed element occupies a certain minimum threshold area and has a substantially four-sided shape generally corresponding to a rectangle. Elements satisfying these criteria may be classified as blocks. Otherwise, the element may be identified as a line.

If the outcome at step 612 is "no," (i.e., the element is a line) then processing may proceed to step 614, at which point a signal line may be drawn at a location in the block diagram model corresponding to the location of the line in the input (and connecting the same elements as were connected in the input). If one of the elements connected by the line has not yet been processed, then it may be processed at this time to determine what type of element it is. Once the element type is identified, the line may be made to connect to the identified element.

If the outcome at step 612 is "yes," then processing may proceed to step 616. When a block is detected, text written inside the identified block may be extracted. The system may perform optical character recognition (OCR) to recognize symbols in the text. If the OCR succeeds, then the system may use the OCR'ed text as the designated name of the block.

In case the OCR fails, the system may save a bitmap representation of the author's writing/diagram and insert it into the block diagram model for later review and updating.

At step 618, the system may use the text extracted at step 616 to determine an identity of the block being drawn. For example, the system may compare the OCR'ed text to a list of names form a library of blocks associated with the block diagram modeling environment. The system may determine whether the requested block exists within the library.

The system may consult a list of synonyms to determine an identity of the requested block, even if the requested block is not properly identified in the manner expected by the software. For example, a user may designate a block using the text "ADD," and there may not be an ADD block in the library. However, the system may recognize that the word "ADD" as being synonymous with "SUM," and may add a SUM block to the model.

The system may also translate requested blocks into different (but equivalent) forms. For example, a user may request a "COS(X)" block, which the system may interpret as a cosine block operating on the value "x". However, the block diagramming software may not implement a cosine block, and the system may instead translate this request into the equivalent representation of "sin(x+pi/2)," which may then be implemented using a sine block.

As an alternative (or in addition) to identifying blocks using text, as is done in steps 616-618, the system may use Simulink (or other block diagram software) specific block icons, or a custom dictionary, to identify a type of the block.

If the answer at step 618 is "NO" (i.e., the requested block does not exist in the library), then processing may proceed to step 620. A generic block may be added to the block diagram model, and the generic block may optionally reference a bitmap of the text from the input image corresponding to the block. Accordingly, implementation details may later be added.

If the answer at step 622 is "YES," (i.e., the requested block exists in the library, then a block corresponding to the requested block may be retrieved from the library. The requested block may be added to the model at the position indicated in the input. A size of the added block may correspond to a size of the block in the input.

It is noted that, although the procedure in FIG. 6A has been described with reference to block diagram models, this procedure may be readily adapted to designing statecharts, as well as other formalisms and combinations.

Another example of a formalism-specific technique is shown in FIG. 6B. Specifically, FIG. 6B depicts a table-specific technique implemented using a MATLAB TCE.

At step 630, the system may identify an area corresponding to each cell area in a table. For example, the system may recognize a number of rectangles in the image, where each rectangle corresponds to a distinct cell. The area within the rectangles may be identified as a cell area.

At step 632, the system may run an optical character recognition (OCR) algorithm to extract characters and/or numbers from respective cell areas.

At step 634, the system may determine a data type in each cell based on an output of the OCR data. The characters and/or numbers may be examined to identify whether the characters and/or numbers fit a predetermined pattern that is mapped to a data type. For example, a series of numbers with no decimal point may be identified as an integer. A series of numbers with a decimal point may be identified as a double or floating point number, as appropriate. A series of alphabetical characters along with zero or more numbers may be identified as a string.

At step 636, the system may construct a table data variable using a MATLAB TCE corresponding to each column (or row) of the table. The sets of characters/numbers identified at step 632 may be cast into the data type identified at step 634, and stored in the table data variable. The table data variables corresponding to each column or row may be appended together in order to create a table.

Yet another example of a formalism-specific technique is shown in FIG. 6C. FIG. 6C depicts an equation-specific technique implemented, for example, using a MATLAB TCE.

At step 640, the system may run an optical character recognition (OCR) algorithm to recognize symbols and characters in the equation. At step 642, the system may determine whether all of the characters in the equation were able to be detected by the OCR algorithm. If some symbols and/or characters are not detected processing may proceed to step 644.

At step 644, any symbols that were successfully detected may be analyzed in order to determine functions, products, toolboxes, classes, etc. that may relate to the equation. For example, if the input equation included the sum symbol, then the available functions and products may be filtered to remove any that do not include the sum symbol. Possible matches to the requested equation may be displayed on a display device. A user may select one of the options to represent the equation.

Optionally, information about the determined functions, products, toolboxes, classes, etc. may be displayed on a display device. For example, help information specific to the determined functions, products, toolboxes, classes, etc. may be displayed. Information about the formalism associated with the symbols, such as formalism-specific help information, may also be displayed.

Images of the unidentified characters may be saved for presentation on a display device alongside the related functions and products. This may assist a user in evaluating the functions and products in order to determine which function or product best matches the input.

If the answer at step 642 is "yes," (i.e., all the symbols or characters were successfully detected, then processing may proceed to step 646. At step 646, the system may change the recognized text of the equation into an appropriate representation (such as LaTeX form, which allows mathematical symbols to be accurately represented). Existing functions or products available to the system may also represent equations corresponding to the function or product in LaTeX form.

At step 648, LaTeX patterns in the equation may be used to search a database of existing products or functions. A product or function that corresponds to the LaTeX patterns in the equation may be selected as a probable match for the equation. At step 650, code for the selected LaTeX representation may be created using a suitable programming environment, such as a Python environment, Octave, or the MATLAB TCE. For example, LaTeX commands may be identified and a mathematical representation corresponding to the LaTeX commands may be identified. These mathematical representations may also correspond to commands, identifiers, operations, etc., in the programming environment (e.g., a MATLAB command, identifier, or operation).

The above-described formalism-specific techniques may be used to generate an output representation that corresponds to the input structure(s). In some embodiments, the corresponding output representation may be equivalent to the input structure(s). If a program, application, environment, or engine is associated with the formalism used to process the input, the program, application, environment, or engine may be used to represent, store, or process the output representation.

Figure 7:
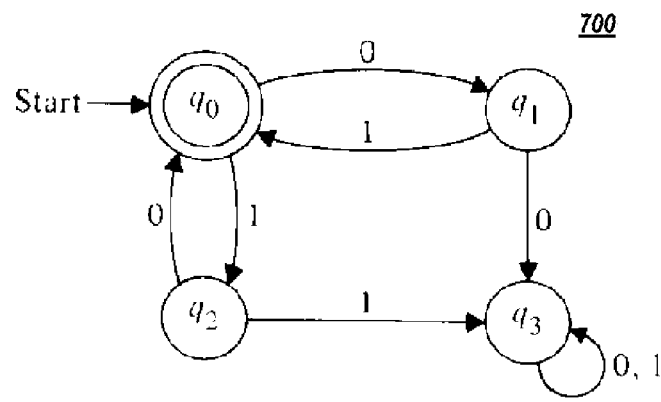
FIGS. 7-13 depict exemplary outputs, transformations, and translations of different types of inputs.
Figure 7:
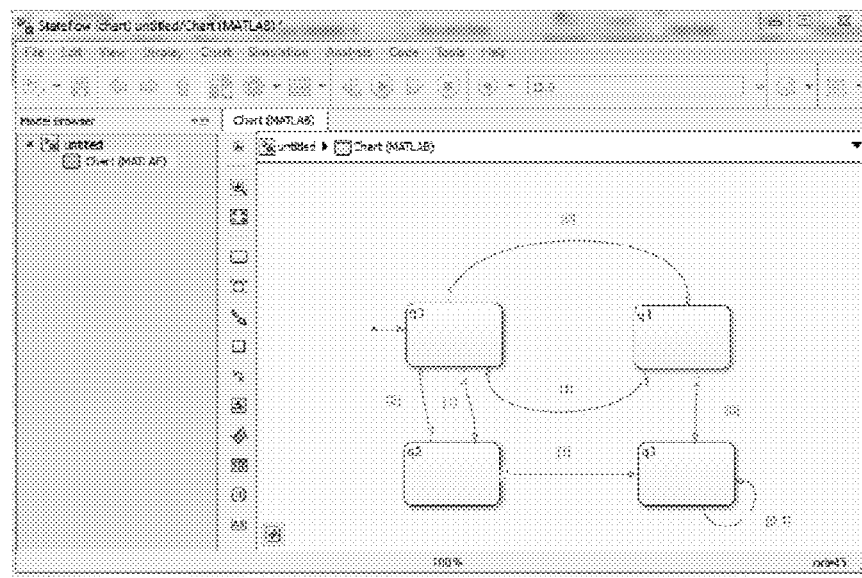

For example, FIG. 7 depicts an example of an input representation 700 including a statechart, which is processed to generate a statechart using the Stateflow graphical modeling environment 710.

Probability table 400 may be used to identify the input representation 700 as corresponding to a statechart. For example, probability table 400 may include elements 406 corresponding to states (e.g., circle elements), transitions (e.g., curved arrows), and text. If the text is inside of a circle, this may indicate that the circle represents a state in a statechart. If the text is outside of a circle and/or present near one of the curved arrows, this may indicate that the text represents a condition for transitioning between two states. If a state is drawn as two concentric circles, this may represent an initial state, which is represented in the statechart environment (in some embodiments) as an arrow with a solid circle as a source point (or other suitable syntax).

FIG. 7 depicts an output representation that directly corresponds to the input. Alternatively (or in addition), the input structure(s) may be transformed or translated into a different format. Examples of suitable transformations or translations are shown in FIGS. 8-12.

Figures 8, 9:
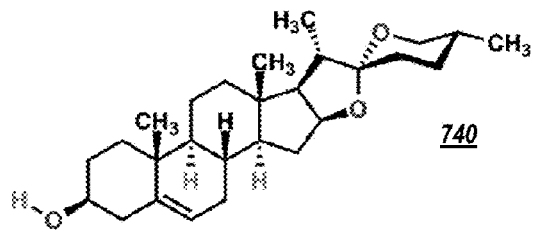

For example, FIG. 8 depicts an example of an equation 720. For example, the equation may originate in a textbook, and may be scanned by a student. In order to identify the input as an equation, the probability table 400 may include elements 406 corresponding to commonly-used mathematical symbols and phrases (e.g., Σ, =, sin, etc.). The equation may be translated using a formalism-specific technique such as the one depicted in FIG. 6C.

The MATLAB (TCE) may perform optical character recognition and convert the picture into a MATLAB equation 730. Alternatively or in addition, the MATLAB TCE may suggest a function and/or toolbox 735 that correspond to the written equation. The toolbox may include a number of functions, and the TCE may suggest the toolbox that includes an appropriate function or may suggest both the toolbox and the appropriate function. For example, the TCE may know that the control toolbox includes the appropriate function based on the context of the input, but the TCE may be unable to determine the specific control toolbox function. In such embodiments, the TCE may recommend the toolbox without specifying the specific function to be used. Still further, the system may generate a solution to the equation and present the solution.

FIG. 9 depicts an example of a graphical chemical structure 740. In order to identify the image as including a chemical structure, the probability table 400 may include elements 406 corresponding to chemical bonds, element and molecule symbols, and common molecular structures (e.g., rings, commonly-used molecules which may be built into larger molecules).

The chemical structure may be analyzed in order to determine, for example, a chemical formula for the structure. The chemical formula may be compared to a database of chemical formulas to determine the name 750 of the molecule or structure shown in the graphical chemical structure.

Figure 10:
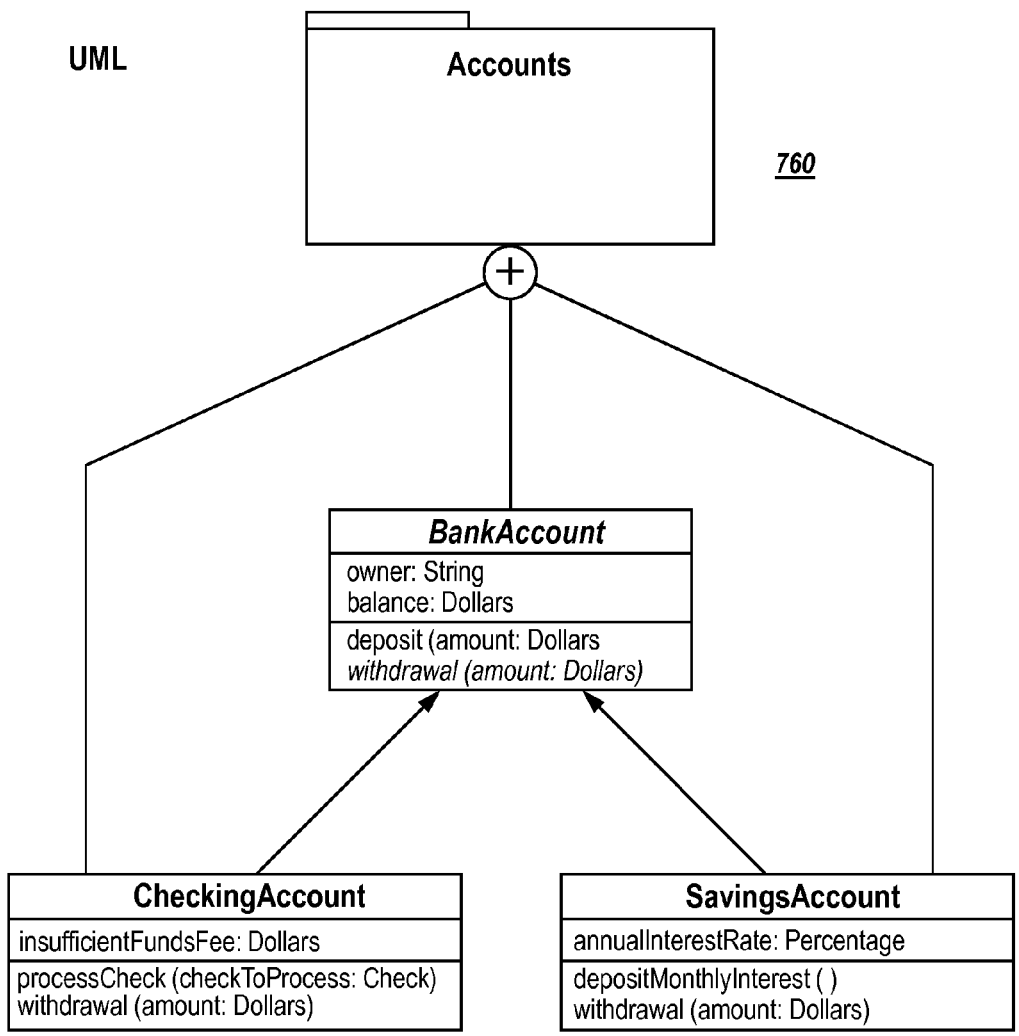

FIG. 10 depicts a UML diagram 760 describing classes (e.g., BankAccount, CheckingAccount, and SavingsAccount) that are each subclasses of the class "Accounts." The image of the UML diagram may be processed and converted into a MATLAB class definition 770 implementing the class(es) described in the UML diagram.

In order to identify the input as including a UML diagram, the probability table 400 may include elements 406 corresponding to arrows, multi-celled tables, and folders. Certain symbols in the text of the image, such as "(", ")", and ":" may be given special significance and may increase the probability that the image contains a UML diagram.

Figure 11:
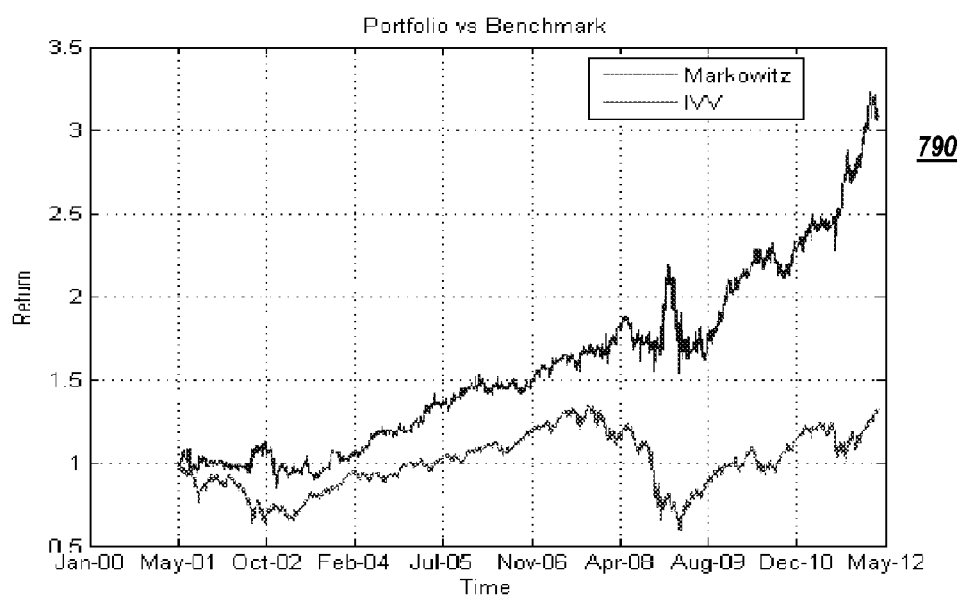

FIG. 11 depicts a table of data 780. The image of the table may be processed and converted into a graph 790. Alternatively or in addition, the table may be converted into MATLAB® table data.

For example, after recognizing that the table 780 belongs to the table formalism, the system may examine the first row and first column to extract labels for the axes or lines of the graph. The system may also examine predetermined locations (such as directly above or below the table) to identify textual candidates that may represent a title for the graph. Cells within the table may be used to generate data values to be populated in the graph at the locations designated by the row and column headers.

Figure 12:
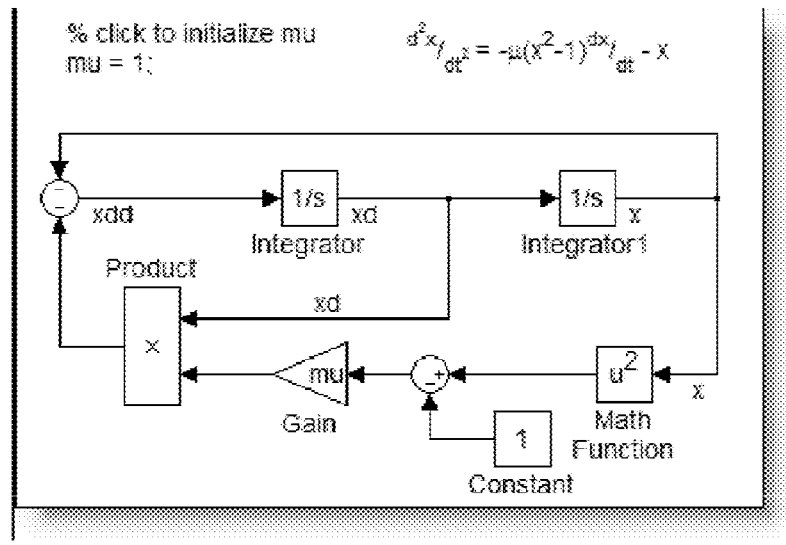

FIG. 12 depicts a still image extracted from a video. The still image may be processed in order to extract one or more structures (such as the block diagram and/or the equation in the image) and may convert those structures into appropriate representations (such as a Simulink® model of the block diagram, or a MATLAB® function corresponding to the equation).

Figure 13:
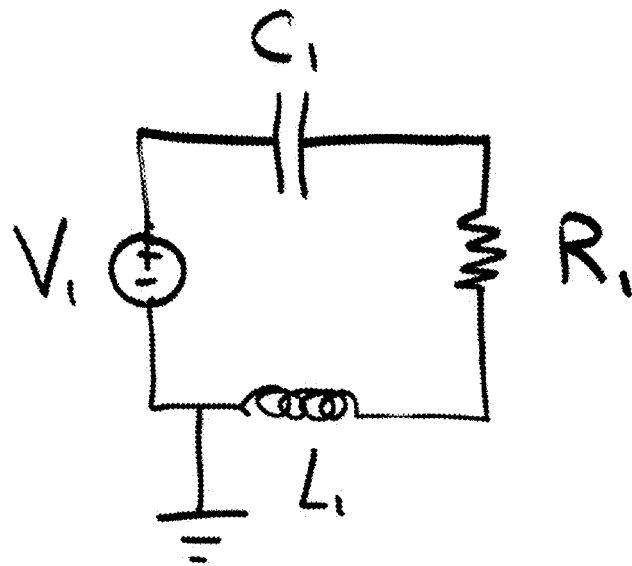
Figure 13:
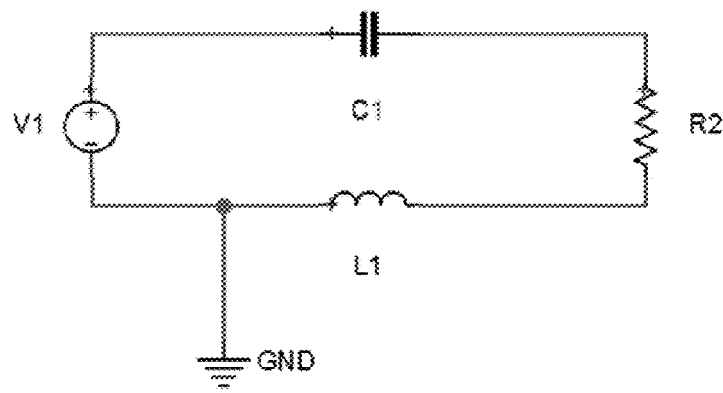

The formalism-specific techniques may also include techniques relating to physical domains, such as (but not limited to) electrical circuit designs (which may be translated into a circuit model), multi-body systems (which may be translated into a multibody diagram model or a time-based block diagram model), and CAD drawings (which may be translated into, for example, a CAD representation in a CAD environment, or a model in a multibody modeling formalism such as SimMechanics™ of The MathWorks, Inc.). FIG. 13 depicts an example of a physical formalism, in which a drawing of an electrical circuit is translated into a SimElectronics® model.

The formalism-specific techniques of FIGS. 6A-6C, and the transformations/translations of FIGS. 7-12 are but a few exemplary embodiments. Many other possibilities exist, depending on the application. Several additional suitable examples are described below:

An image of a tabular column of data may be provided to MATLAB®, which may convert the column into a table variable. The table variable may be added to an existing table.

A circuit designer may be provided with a handout showing an electrical circuit, and may scan the handout. The resulting scanned image may be provided to Simulink®, which may convert the image into a SimElectronics® model.

A user may encounter a MATLAB® plot, and may want to know the MATLAB® function that generated the plot. The user may take a picture of the plot and provide the picture to MATLAB®. MATLAB® may process the picture and suggest functions that would generate a similar-looking plot. For example, MATLAB® may identify relevant features of the input image that correspond to MATLAB plot-generation functions, such as font sizes, axes settings, legends, grid settings, colors, and markers.

A user may need to know what product or toolbox to use for a particular task. The user may speak about the task to MATLAB®, and MATLAB® may convert the audio description into a call to a toolbox or product, and provide the described toolbox or product to the user. For example, a speech-to-text utility may convert spoken words into a format that can be processed and used by an application, such as MATLAB.

An image of a time-based block diagram model may be scanned, and code (such as C code, C++ code, HDL code, or PLC code) for the time-based block diagram model may be output.

An image of source code may be scanned, the programming language or languages of the source code may be identified and a data structure of appropriate syntax in the identified programming language or in another programming language may be generated.

A user may draw an input image of a time-based block diagram model on a whiteboard. A camera may record the input image and a processor may process the input image to transform the input image into a Simulink® block diagram model. The translated block diagram model may then be projected onto the whiteboard by a projector, and the original drawing may be erased. The user may then proceed to draw on the whiteboard to modify or annotate the projected model.

Figure 14:
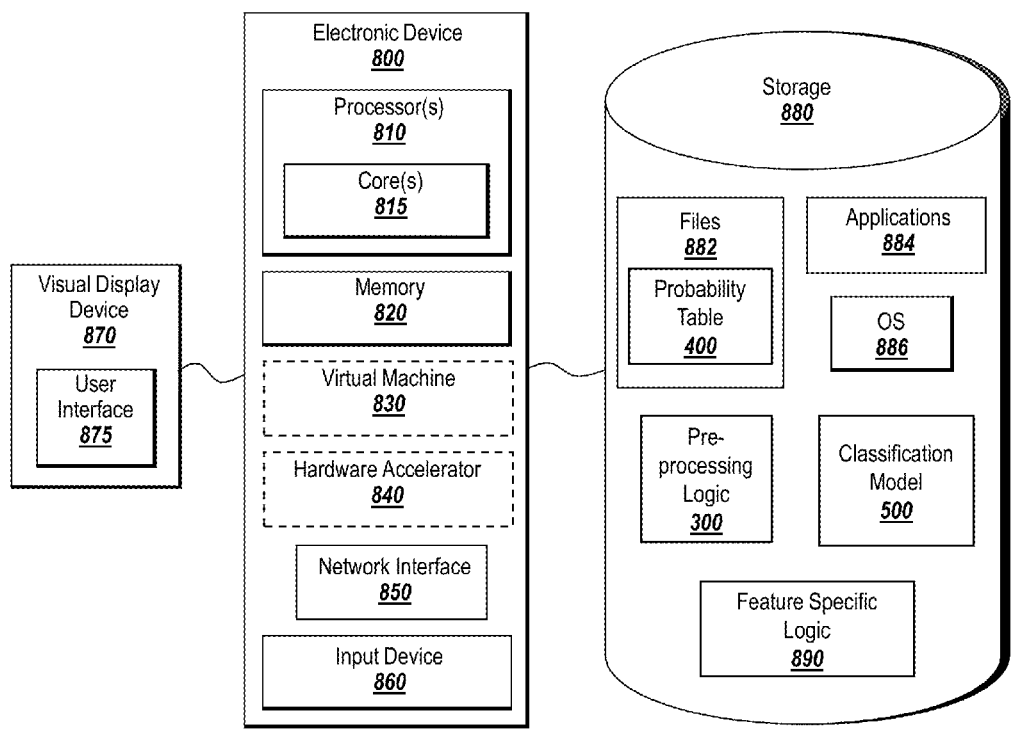
FIG. 14 depicts an electronic device suitable for use with exemplary embodiments.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 14 depicts an example of an electronic device 800 that may be suitable for use with one or more acts disclosed herein.

The electronic device 800 may take many forms, including but not limited to a computer, workstation, server, network computer, Internet appliance, mobile device, a tablet computer, a smart sensor, application specific processing device, etc.

The electronic device 800 is illustrative and may take other forms. For example, an alternative implementation of the electronic device 800 may have fewer components, more components, or components that are in a configuration that differs from the configuration of FIG. 14. The components of FIG. 14 and/or other figures described herein may be implemented using hardware based logic, and/or logic that is a combination of hardware and software based logic (e.g., hybrid logic); therefore, components illustrated in FIG. 14 and/or other figures are not limited to a specific type of logic.

The processor 810 may include hardware based logic or a combination of hardware based logic and software to execute instructions on behalf of the electronic device 800. The processor 810 may include logic that may interpret, execute, and/or otherwise process information contained in, for example, the memory 820. The information may include computer-executable instructions and/or data that may implement one or more embodiments of the invention. The processor 810 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 815. Moreover, the processor 810 may include a system-on-chip (SoC) or system-in-package (SiP). An example of a processor 810 is the Intel® Xeon® processor available from Intel Corporation, Santa Clara, Calif.

The electronic device 800 may include one or more tangible non-transitory computer-readable storage media for storing one or more computer-executable instructions that may implement one or more embodiments of the invention. The non-transitory computer-readable storage media may be, for example, the memory 820 or the storage 880. The memory 820 may comprise a random access memory (RAM) that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

The electronic device 800 may include a virtual machine (VM) 830 for executing instructions loaded in the memory 820. A virtual machine 830 may be provided to handle a process running on multiple processors so that the process may appear to be using only one computing resource rather than multiple computing resources. Virtualization may be employed in the electronic device 800 so that infrastructure and resources in the electronic device may be shared dynamically. Multiple VMs 830 may be resident on a single computing device 800.

A hardware accelerator 840, may be implemented in an ASIC, FPGA, or some other device. The hardware accelerator 840 may be used to reduce the general processing time of the electronic device 800.

The electronic device 800 may include a network interface 850 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 850 may include a built-in network adapter, network interface card, personal computer memory card international association (PCMCIA) network card, card bus network adapter, wireless network adapter, universal serial bus (USB) network adapter, modem or any other device suitable for interfacing the electronic device 800 to any type of network capable of communication and performing the operations described herein.

The electronic device 800 may include one or more input devices 860, such as position-based input devices, velocity-based input devices, visual input devices, spatial input devices, audio input devices, wearable input devices, stationary and mobile input devices, augmented reality devices, and projections. Examples of such input devices include, but are not limited to a keyboard, an interactive whiteboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 800 may include other suitable I/O peripherals.

The input devices 860 may allow a user to provide input. The input may be registered on a visual display device 870. A graphical user interface (GUI) 875 may be shown on the display device 870.

A storage device 880 may also be associated with the electronic device 800. The storage device 880 may be accessible to the processor 810 via an I/O bus or other suitable mechanism and/or technique. The information in the storage device 880 may be executed, interpreted, manipulated, and/or otherwise processed by the processor 810. The storage device 880 may include, for example, a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 880 may be used for storing one or more files 882, such as the above-described probability table 400. The storage device 880 may further store applications 884, such as the above-described programs, applications, environments, or engines.

The electronic device 810 can further be running an operating system (OS) 886. Examples of OS 886 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

Additionally, the storage device 880 may store logic corresponding to the pre-processing logic 300, the classification model 500, and feature-specific processing logic 890.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 15:
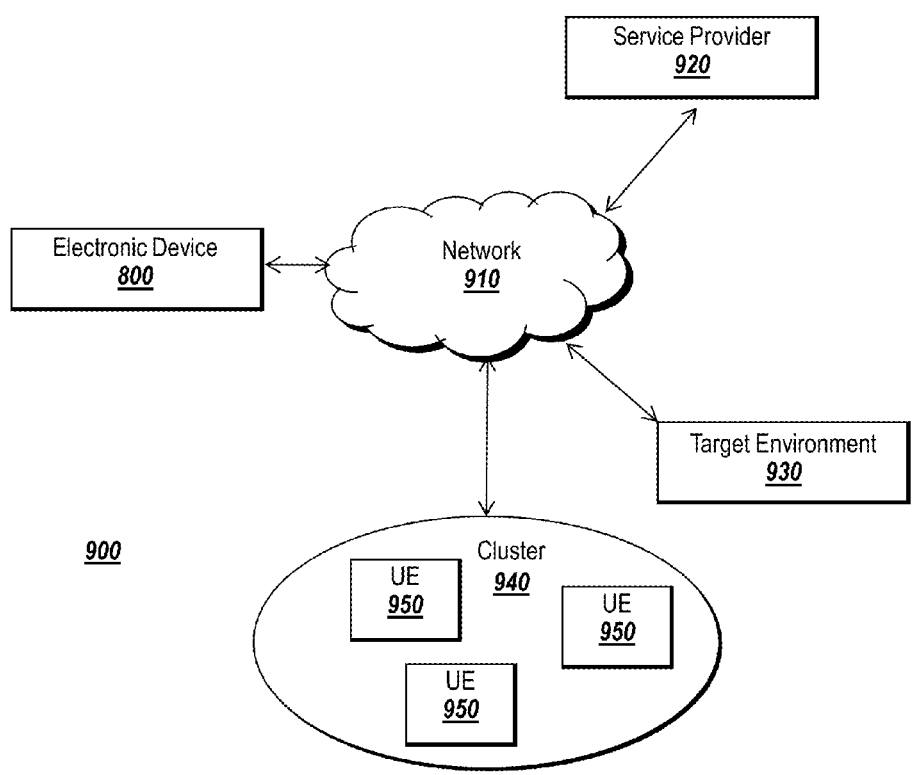
FIG. 15 depicts an exemplary network configuration suitable for use with exemplary embodiments.

In some embodiments, the electronic device 800 may be part of a network implementation. FIG. 15 depicts an exemplary network implementation that may implement one or more embodiments of the invention. A system 900 may include an electronic device 800, a network 910, a service provider 920, a target environment 930, and a cluster 940. The embodiment of FIG. 15 is exemplary, and other embodiments can include more devices, fewer devices, or devices in arrangements that differ from the arrangement of FIG. 9.

The network 910 may transport data from a source to a destination. Embodiments of the network 910 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the electronic device 800, the service provider 920, etc.). Data may include digital information or analog information. Data may further be packetized and/or non-packetized.

The network 910 may be a hardwired network using wired conductors and/or optical fibers and/or may be a wireless network using free-space optical, radio frequency (RF), and/or acoustic transmission paths. In one implementation, the network 910 may be a substantially open public network, such as the Internet. In another implementation, the network 910 may be a more restricted network, such as a corporate virtual network. The network 910 may be the Internet, an intranet, Local Area Network (LAN), Wide Area Network (WAN), Metropolitan Area Network (MAN), wireless network (e.g., using IEEE 802.11), or other types of network. The network 910 may use middleware, such as Common Object Request Broker Architecture (CORBA) or Distributed Component Object Model (DCOM) Implementations of networks and/or devices operating on networks described herein are not limited to, for example, any particular data type, protocol, and/or architecture/configuration.

The service provider 920 may include a device that makes a service available to another device. For example, the service provider 920 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 930 may include a device that receives information over the network 910. For example, the target environment 930 may be a device that receives user input from the electronic device 900.

The cluster 940 may include a number of units of execution (UEs) 950 and may perform processing on behalf of the electronic device 800 and/or another device, such as the service provider 920. For example, the cluster 940 may perform parallel processing on an operation received from the electronic device 800. The cluster 940 may include UEs 950 that reside on a single device or chip or that reside on a number of devices or chips.

The units of execution (UEs) 950 may include processing devices that perform operations on behalf of a device, such as a requesting device. A UE may be a microprocessor, field programmable gate array (FPGA), and/or another type of processing device. UE 950 may include code, such as code for an operating environment. For example, a UE may run a portion of an operating environment that pertains to parallel processing activities. The service provider 920 may operate the cluster 940 and may provide interactive optimization capabilities to the electronic device 800 on a subscription basis (e.g., via a web service).

Units of Execution (UEs) may provide remote/distributed processing capabilities for products such as the MATLAB TCE. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming) Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of a electronic device, unless otherwise stated.

It is intended that the invention not be limited to the particular embodiments disclosed above, but that the invention will include any and all particular embodiments and equivalents falling within the scope of the following appended claims.

The invention claimed is:
1. A non-transitory computer readable medium storing instructions, the instructions comprising:
  one or more instructions that, when executed, cause a processor to:
    receive an input, the input comprising a plurality of input elements;
    parse the input to identify:
      a first element from among the plurality of input elements, the first element represented according to a formalism type that identifies having a syntax for organizing elements of the formalism type, and
      a second element from among the plurality of input elements, the second element represented according to the formalism type;
    access a library comprising entries for different formalism types, the formalism type included in the different formalism types;
    determine a likelihood that the first element and the second element coexist in a selected formalism type from among the different types of formalisms in the library, and
    select, based on the determining, the selected formalism type that is consistent with a coexistence of the first element and the second element;
    wherein the selected formalism type is one of the following: an equation, a state diagram, a plot, a chart, a table, a Unified Modeling Language (UML) diagram, a chemical formula, a block diagram model, a type of diagram, a multi-body modeling formalism, a computer-aided design formalism, a physical modeling formalism or source code,
    generate an output, the output:
      comprising the first element and the second element, and
      at least partly represented in a format corresponding to the selected formalism type; and
      wherein if the selected formalism type is an equation, the format is a solution to the equation or a source code function representing the equation;
      wherein if the selected formalism type is a state diagram, the format is a state chart model representing the state diagram;
      wherein if the selected formalism type is a plot, the format is a source code command that when executed generates the plot or a table of data represented in the plot;

wherein if the selected formalism type is a table, the format is a plot or a chart representing the table;

wherein if the selected formalism type is a chart, the format is a table of data represented in the chart;

wherein if the selected formalism type is a UML diagram, the format is a source code class representing the UML diagram;

wherein if the selected formalism type is a chemical formula, the format is a name of a chemical represented by the chemical formula;

wherein if the selected formalism type is a block diagram model, the format is a source code representation of the block diagram model; and wherein if the selected formalism type represents source code, the format is a block diagram model.

2. The medium of claim 1, wherein the plurality of input elements of the input include a first set of elements represented according to a first formalism type and a second set of elements represented according to a second formalism type distinct from the first formalism type.

3. The medium of claim 1, wherein the output comprises output elements corresponding to a plurality of distinct formalisms such that the output is partly represented in the format corresponding to the selected formalism type, and is further represented in a second format corresponding to a second selected formalism type that is distinct from the selected formalism type.

4. The medium of claim 1, wherein different formalism types are processed by different types of processing engines or environments.

5. The medium of claim 1, wherein different formalism types have different alphabets, syntaxes, or semantics.

6. The medium of claim 1, wherein the input comprises one or more of:
an image;
video;
audio; and
gesture data.

7. The medium of claim 1, wherein the library comprises a table of probabilities that a type of element is found in each of the formalism types in the library.

8. The medium of claim 7, wherein the probabilities are dynamically updated based on user-feedback about a classification of the input into a formalism type.

9. The medium of claim 7, wherein the probabilities are dynamically updated based on historical classifications of formalism types.

10. The medium of claim 7, wherein analyzing the first element and the second element comprises:
determining a first probability, the first probability representing a probability that the first element belongs to the selected formalism type;
determining a second probability, the second probability representing a probability that the second element belongs to the selected formalism type; and
adding the first probability to the second probability.

11. The medium of claim 1, wherein the second element is identified, at least in part, based on a predicted formalism type that is determined based on an analysis of the first element.

12. The medium of claim 1, wherein generating the output comprises applying a formalism-specific rule to the first element or the second element, the formalism-specific rule being particular to the selected formalism type.

13. The medium of claim 1, wherein generating the output comprises processing the first element and the second element using a formalism-specific procedure.

14. The medium of claim 1, further comprising displaying help information specific to the selected formalism type, the first element, or the second element.

15. A method comprising:
receiving, using a processor of a computing device, an input, the input comprising a plurality of input elements;
parsing the input, the parsing:
performed using the processor,
identifying a first element from among the plurality of input elements, and
identifying a second element from among the plurality of input elements,
wherein the first element and the second element are represented according to a formalism type defining a syntax for organizing elements of the formalism type;
access a library comprising entries for different formalism types;
evaluating a likelihood that the first element and the second element coexist together in a selected formalism type from among the different formalism types in the library, and
selecting, based on the evaluating, the selected formalism type that is consistent with a coexistence of the first element and the second element;
wherein the selected formalism type is one of the following: an equation, a state diagram, a plot, a chart, a table, a Unified Modeling Language (UML) diagram, a chemical formula, a block diagram model, a type of diagram, a multi-body modeling formalism, a computer aided design formalism, a physical modeling-formalism or source code,
generating, using the processor, an output, the output:
representing a translation of at least part of the input into an output type that is associated with the selected formalism type; and
wherein if the selected formalism type is an equation, the translation is a solution to the equation or a source code function representing the equation;
wherein if the selected formalism type is a state diagram, the translation is a state chart model representing the state diagram;
wherein if the selected formalism type is a plot, the translation is a source code command that when executed generates the plot or a table of data represented in the plot;
wherein if the selected formalism type is a table, the translation is a plot or a chart representing the table;
wherein if the selected formalism type is a chart, the translation is a table of data represented in the chart;
wherein if the selected formalism type is a UML diagram, the translation is a source code class representing the UML diagram;
wherein if the selected formalism type is a chemical formula, the translation is a name of a chemical represented by the chemical formula;
wherein if the selected formalism type is a block diagram model, the translation is a source code representation of the block diagram model; and
wherein if the selected formalism type represents source code, the format is a block diagram model.

16. A system comprising:
a non-transitory computer readable medium storing an input, the input:

comprising a plurality of input elements, and
being uninterpretable by an engine associated with a selected formalism type; and
a processor programmed with instructions that, when executed, cause the processor to:
parse the input to identify:
a first element from among the plurality of input elements, and
a second element from among the plurality of input elements,
wherein the first element and the second element are represented according to
a formalism type defining a syntax for organizing elements of the formalism type;
access a library comprising entries for different formalism types, the different formalism types comprising the selected formalism type associated with the engine;
analyze the first element and the second element, the analyzing:
examining the first element in context with the second element to evaluate a likelihood that the first element and the second element coexist together in the selected formalism type, and
selecting, based on the examining, the selected formalism that is consistent with a coexistence of the first element and the second element;
wherein the selected formalism type is one of the following: an equation, a state diagram, a plot, a chart, a table, a Unified Modeling Language (UML) diagram, a chemical formula, a block diagram model, a type of diagram, a multi-body modeling formalism, a computer-aided design formalism, a physical formalism or source code, generate an output, the output:
comprising the first element and the second element, and
at least partly represented in a format corresponding to the selected formalism type,
wherein the output is interpretable by the engine associated with the selected formalism; and
wherein if the selected formalism type is an equation, the format is a solution to the equation or a source code function representing the equation;
wherein if the selected formalism type is a state diagram, the format is a state chart model representing the state diagram;
wherein if the selected formalism type is a plot, the format is a source code command that when executed generates the plot or a table of data represented in the plot;
wherein if the selected formalism type is a table, the format is a plot or a chart representing the table;
wherein if the selected formalism type is a chart, the format is a table of data represented in the chart;
wherein if the selected formalism type is a UML diagram, the format is a source code class representing the UML diagram;
wherein if the selected formalism type is a chemical formula, the format is a name of a chemical represented by the chemical formula;
wherein if the selected formalism type is a block diagram model, the format is a source code representation of the block diagram model; and
wherein if the selected formalism type represents source code, the format is a block diagram model.

* * * * *

UNITED STATES PATENT AND TRADEMARK OFFICE
CERTIFICATE OF CORRECTION

PATENT NO.         : 9,530,102 B2                       Page 1 of 1
APPLICATION NO.    : 14/623985
DATED              : December 27, 2016
INVENTOR(S)        : Pieter J. Mosterman et al.

It is certified that error appears in the above-identified patent and that said Letters Patent is hereby corrected as shown below:

In the Claims

In Column 20, Line 31, in Claim 1, after "type" delete "that identifies".

Signed and Sealed this
Fourth Day of April, 2017

Michelle K. Lee
*Director of the United States Patent and Trademark Office*